Sept. 17, 1940.  J. A. KAMMERDINER  2,215,044
AUTOMATIC SHUTOFF VALVE
Filed Feb. 1, 1939
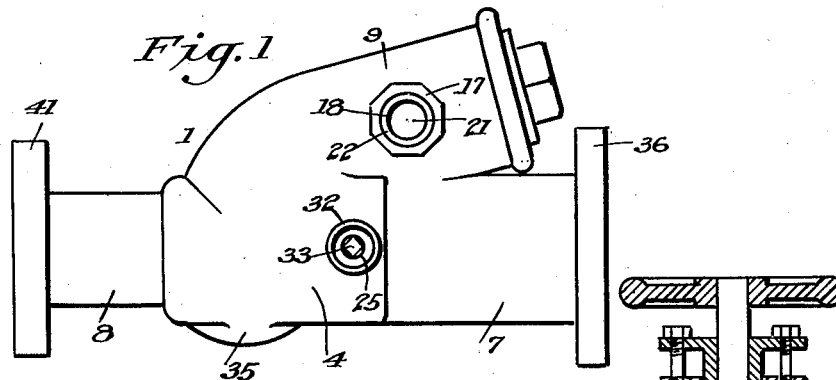
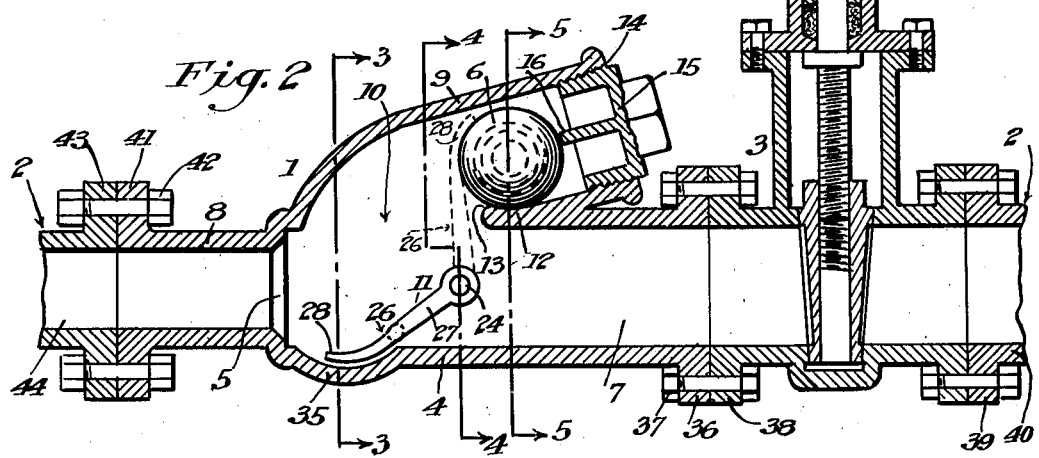
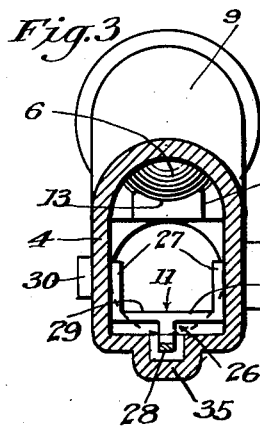 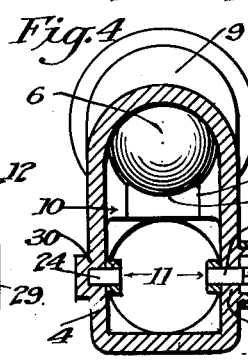 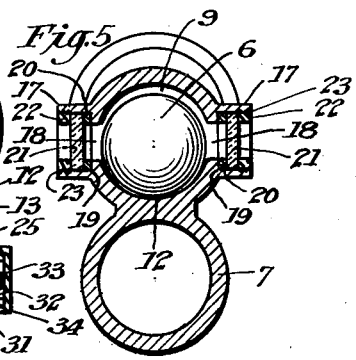
INVENTOR:
James A. Kammerdiner,
BY Alan Franklin
ATTORNEY.

Patented Sept. 17, 1940

2,215,044

UNITED STATES PATENT OFFICE 2,215,044

AUTOMATIC SHUTOFF VALVE

James A. Kammerdiner, Los Angeles, Calif.

Application February 1, 1939, Serial No. 254,023

4 Claims. (Cl. 137—139)

This invention relates to valves, and more particularly to an automatic shutoff valve.

The general object of the invention is to provide a valve to be connected in a pipe line, which will automatically close the pipe and shut off the flow of fluid through the pipe line in the event of the pipe being broken by a shock, such as an earthquake.

Other objects and advantages will appear hereinafter.

The invention is illustrated in the annexed drawing which forms a part of this specification and in which:

Fig. 1 is a side view of my automatic shutoff valve.

Fig. 2 is a longitudinal section of a fragment of a pipe line and my automatic shutoff valve included in said pipe line.

Fig. 3 is a cross section of my automatic shutoff valve taken on line 3—3 of Fig. 2.

Fig. 4 is a cross section of my automatic shutoff valve taken on line 4—4 of Fig. 2.

Fig. 5 is a cross section of my automatic shutoff valve taken on line 5—5 of Fig. 2.

Referring more particularly to the drawing, in which corresponding parts are designated by the same reference characters in all of the views, 1 designates my automatic shutoff valve in its entirety, which is shown, in Fig. 2, connected in a pipe line 2 adjacent a conventional gate valve 3 in said pipe line.

My automatic shutoff valve 1 is preferably of the ball-valve type, including generally a valve housing 4, formed with a valve seat 5, and a valve ball 6 adapted to seat upon said seat 5 to close the valve. The valve housing 4 is formed at one end with a tubular inlet member 7, and at its other end with a tubular outlet member 8 in the inner end of which is formed the valve seat 5. A tubular ball-retaining pocket 9 is formed on the upper side of the valve housing 4 and inlet member 7 and inclines downwardly to the upper side of said valve housing, there being an opening 10 between the forward end of said pocket 9 and the upper side of said valve housing, through which opening the ball 6 may drop from the pocket 9 into said valve housing adjacent the valve seat 5, or the ball may be raised from said valve housing through said opening into said pocket by a valve setting device 11, in the manner and for the purpose hereinafter more fully set forth. The pocket 9 is formed, at its lower side, at the rear of the opening 10, with a ball rest 12, upon which the ball 6 normally rests with the valve in its normal open position, the upper surface of said rest curving upwardly slightly to the rear edge of the opening 10, as indicated at 13, for engaging the lower side of the ball 6, forwardly of its center, for normally retaining said ball on said rest, but allowing the ball to roll over it off the rest 12 and drop through the opening 10 into the valve housing 4, when the pipe line is subjected to a shock, such as an earthquake, and the pipe line, forwardly of the valve, is broken by said shock. The pocket 9 is provided in its rear end with a threaded opening 14 in which a screw plug 15 is screw seated, which plug is formed with a stop 16 projecting inwardly beyond the inner end of the plug for engaging the rear side of the ball 6 and limiting the rearward movement of said ball to its position upon the rest 12 as shown in Fig. 2. On the side walls of the pocket 9 are formed respectively a pair of outstanding bosses 17, which bosses are formed with sight openings 18 leading therethrough into opposite sides of the pocket 9, and said sight openings are reduced in diameter at their inner end portions to form annular shoulders 19 near their inner ends. In the outer enlarged portion of each sight opening 18 are fitted a gasket 20, a glass disk 21 and a screw lock ring 22, said gasket resting against the shoulder 19 in said sight opening and said glass disk being clamped against said gasket by said lock ring, which ring is screw-seated at 23 in the outer end of said sight opening.

The valve-setting device 11 comprises a pair of pivot studs 24 and 25 and a forked arm 26, formed with a pair of arm members 27 and a ball engaging member 28 joined at its inner end to the inner ends of said arm members by cross members 29, the outer ends of said arm members 27 being secured to the inner ends of said pivot studs 24 and 25, respectively, within the valve housing 4, which studs are journaled in bearings 30 and 31 in the side walls respectively of the valve housing 4, with the stud 25 extending outwardly through one of the side walls of said compartment into a hollow boss 32 formed on the outside of said wall. The pivot stud 25 is formed with a square outer end 33 to receive a wrench for swinging the arm 26. The boss 32 is closed by a screw cap 34 which is threaded on said boss. The valve housing 4 is formed in its lower wall with a pocket 35 to receive the ball-engaging member 28 of the arm 26, when said arm is in its normal lower position to permit the ball 6 to drop into said valve housing 4 to seat upon the seat 5, as will be hereinafter more fully set forth.

The outer end of the inlet member 7 of my valve is formed with an external flange 36 which is bolted by bolts 37 to an external flange 38 on the outlet of the gate valve 3 or to an external flange 39 on the forward end of a pipe section 40 in the pipe line 2, when the gate valve 3 is not used or is connected at another point in the pipe line. The outer end of the outlet member 8 is formed with an external flange 41 which is bolted, by bolts 42, to an external flange 43 on the adjoining rear end of a pipe section 44 in the pipe line 2.

The operation of my invention is as follows:

Normally, my shutoff valve is open to permit the fluid to pass through the pipe line 2, and in the open position of the valve the ball 6 is supported upon the rest 12 and is retained thereon by the engagement of the slightly upturned forward end 13 of said rest with the lower forward side of said ball.

When the pipe line 2 forwardly of my shutoff valve is broken by a shock, such as an earthquake, the vibration of my valve, caused by said shock, causes the ball 6 to roll off the rest 12, over the upturned edge 13 of said rest, and drop through the opening 10 into the valve housing 4, where the pressure of the fluid, passing through the valve, forces the ball 6 upon its seat 5, which closes the valve and shuts off the flow of fluid through the pipe line 2 forwardly of the valve.

When the broken pipe line is repaired the cap 34 is unscrewed from the boss 32, a wrench is applied to the square end 33 of the pivot stud 25, and said stud, together with the arm 26 are swung clockwise (Fig. 2) by said wrench, whereupon the engaging member 28 of said arm, engaging the lower side of the ball 6, swings said ball upwardly through the valve housing 4 and opening 10, into the pocket 9 and upon the rest 12 where the ball is retained by the upwardly curved end 13 of said rest, thus resetting the valve until there is another break in the pipe line.

I do not limit my invention to the exact construction herein disclosed since various changes may be made therein without departing from the spirit of the invention.

I claim:

1. An automatic shutoff valve comprising a valve housing formed with an inlet, an outlet and a valve seat in said outlet, a pocket above said valve housing formed with a rest, a valve ball, and a ball setting device for swinging said ball upwardly from said valve housing into said pocket upon said rest, said rest being constructed and arranged to retain said ball in said pocket until the valve is subjected to shock, whereupon said ball drops into the valve housing to be seated upon said seat by the pressure of the fluid passing through the valve.

2. An automatic shutoff valve comprising a valve housing formed with an inlet, an outlet and a seat, a valve ball, and a pocket formed with a rest for normally supporting said ball off its seat, said rest being constructed and arranged to retain thereon said ball, until the valve is subjected to sufficient shock to cause said ball to roll off said rest into said housing to be seated upon said seat by the pressure of the fluid flowing through the valve, said pocket being open at its rear end, and a plug screw-seated in said open end of said pocket and formed with a stop on its inner end for limiting the rearward movement of said ball in said pocket for adjustably positioning said ball on said rest.

3. An automatic shutoff valve as claimed in claim 2 in which the ball pocket is formed with a sight opening through which the valve ball may be seen when it is supported upon the rest in said pocket.

4. An automatic shutoff valve comprising a valve housing formed with an inlet, an outlet and a valve seat in said outlet, a valve ball, a pocket formed with a rest for normally supporting said ball off its seat, said rest being constructed and arranged to retain thereon said ball, until the valve is subjected to sufficient shock to cause said ball to roll off said rest into said housing to be seated upon said seat by the pressure of the fluid flowing through the valve, a valve setting device comprising an arm pivoted in said housing, and means for swinging said arm to cause it to engage and swing said ball into said pocket upon said rest.

JAMES A. KAMMERDINER.